US011384647B2

(12) United States Patent
Okabe et al.

(10) Patent No.: US 11,384,647 B2
(45) Date of Patent: Jul. 12, 2022

(54) COMPOSITE BLADE AND METHOD FOR MOLDING COMPOSITE BLADE (71) Applicant: MITSUBISHI HEAVY INDUSTRIES, LTD., Tokyo (JP)

(72) Inventors: Ryoji Okabe, Tokyo (JP); Masami Kamiya, Tokyo (JP); Kentaro Shindo, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 103 days.

(21) Appl. No.: 16/790,903

(22) Filed: Feb. 14, 2020

(65) Prior Publication Data
US 2020/0400027 A1 Dec. 24, 2020

(30) Foreign Application Priority Data

Jun. 19, 2019 (JP) .............................. JP2019-113879

(51) Int. Cl.
F01D 5/28 (2006.01)
B29C 70/22 (2006.01)
B29C 70/30 (2006.01)
B29C 70/34 (2006.01)
F01D 5/30 (2006.01)
B29L 31/08 (2006.01)

(52) U.S. Cl.
CPC ............ F01D 5/282 (2013.01); B29C 70/222 (2013.01); B29C 70/30 (2013.01); B29C 70/345 (2013.01); F01D 5/3007 (2013.01); F01D 5/3092 (2013.01); B29L 2031/08 (2013.01); F05D 2240/80 (2013.01); F05D 2300/6034 (2013.01)

(58) Field of Classification Search
CPC ...... F01D 5/282; F01D 5/3007; F01D 5/3092; B29C 70/222; B29C 70/30; B29L 2031/08
See application file for complete search history.

(56) References Cited

U.S. PATENT DOCUMENTS 5,804,756 A 9/1998 Christensen
6,290,466 B1 9/2001 Ravenhall et al.
9,004,874 B2 4/2015 Jamison
(Continued)

FOREIGN PATENT DOCUMENTS

EP 2 423 440 2/2012
JP 2016-527426 9/2016
(Continued)

OTHER PUBLICATIONS

Dong et al., Evaluation of thermal expansion coefficient of carbon fiber reinforced composites using electronic speckle interforometry, Jan. 2018.*
(Continued)

Primary Examiner — Ninh H. Nguyen
Assistant Examiner — John S Hunter, Jr.
(74) Attorney, Agent, or Firm — Wenderoth, Lind & Ponack, L.L.P.

(57) ABSTRACT

A composite blade formed by laying up composite layers containing reinforcing fiber and resin, the composite blade comprising: a blade root mounted in a blade groove; an airfoil extending from the blade root to a front end side; and a metal patch mounted between the blade groove and the blade root, and bonded to the blade root.

8 Claims, 6 Drawing Sheets (56) References Cited

U.S. PATENT DOCUMENTS

| | | | |
|---|---|---|---|
| 9,039,379 B2* | 5/2015 | Radomski | F01D 5/3007 416/220 R |
| 9,453,422 B2 | 9/2016 | Hile et al. | |
| 10,774,660 B2* | 9/2020 | Luczak | F01D 5/3092 |
| 11,066,939 B2 | 7/2021 | Okabe et al. | |
| 2012/0230829 A1 | 9/2012 | Benkler et al. | |
| 2013/0216389 A1 | 8/2013 | Jamison | |
| 2014/0286756 A1 | 9/2014 | Hile et al. | |
| 2015/0050158 A1* | 2/2015 | Thomas | F01D 5/3084 416/241 R |
| 2016/0245100 A1* | 8/2016 | Luczak | F01D 5/288 |
| 2016/0341052 A1* | 11/2016 | Li | F01D 5/3007 |
| 2020/0095873 A1 | 3/2020 | Okabe et al. | |
| 2021/0108521 A1 | 4/2021 | Okabe et al. | |

FOREIGN PATENT DOCUMENTS

| | | |
|---|---|---|
| WO | 2014/193512 | 12/2014 |
| WO | 2015/057369 | 4/2015 |
| WO | 2018/221596 | 12/2018 |

OTHER PUBLICATIONS

S-bond blog, Accounting for material thermal expansion and torsional, tensile strength, Nov. 2013.*

English translation of Office Action dated Dec. 9, 2021 in Chinese Application No. 202010097748.3.

Dong, Chengzhi et al., "Evaluation of thermal expansion coefficient of carbon fiber reinforced composites using electronic speckle interferometry", Optics Express, vol. 26, No. 1, pp. 531-533.

Extended European Search Report dated Sep. 10, 2020 in corresponding European Patent Application No. 20156467.1.

* cited by examiner

COMPOSITE BLADE AND METHOD FOR MOLDING COMPOSITE BLADE

CROSS-REFERENCE TO RELATED APPLICATIONS

The present application claims priority to and incorporates by reference the entire contents of Japanese Patent Application No. 2019-113879 filed in Japan on Jun. 19, 2019.

FIELD

The present invention relates to a composite blade and a method for molding a composite blade.

BACKGROUND

Traditionally, a composite blade that has a metal patch mounted between a shank at a radial inner end of an airfoil and a dovetail connected to the shank is known (refer to, for example, Japanese Patent Application Laid-open No. 2016-527426 A). The metal patch is adhesively bonded to the dovetail to reduce stress concentrated on the shank and the dovetail.

In the composite blade described in Japanese Patent Application Laid-open No. 2016-527426 A, the metal patch and the dovetail are adhesively bonded to each other, but a linear expansion coefficient of the metal patch is different from a linear expansion coefficient of the dovetail. Thus, when the metal patch and the dovetail are heated, shear stress occurs in an adhesive interface between the metal patch and the dovetail due to the difference between the linear expansion coefficients and may reduce adhesive strength between the metal patch and the dovetail.

Therefore, an object is to provide a composite blade and a method for molding a composite blade, which are able to suppress a reduction in bonding strength between a blade root and a metal patch.

A composite blade according to the present invention formed by laying up composite layers containing reinforcing fiber and resin is disclosed. The composite blade includes a blade root mounted in a blade groove, an airfoil extending from the blade root to a front end side, and a metal patch mounted between the blade groove and the blade root, and bonded to the blade root. The blade root is a laminate with the laid-up composite layers and includes an airfoil laminate continuous from the airfoil, a blade root inner laminate mounted on the inner side of the airfoil laminate, and a blade root outer laminate mounted on the outer side of the airfoil laminate, and the reinforcing fiber is oriented in the blade root inner laminate and the blade root outer laminate so that a linear expansion coefficient of the blade root is approximate to a linear expansion coefficient of the metal patch.

A method for molding a composite blade according to the present invention formed by laying up composite layers containing reinforcing fiber and resin is disclosed. The composite blade includes a blade root mounted in a blade groove, an airfoil extending from the blade root to a front end side, and a metal patch mounted between the blade groove and the blade root and bonded to the blade root, and the blade root is a laminate with the laid-up composite layers and includes an airfoil laminate continuous from the airfoil, a blade root inner laminate mounted on the inner side of the airfoil laminate, and a blade root outer laminate mounted on the outer side of the airfoil laminate. The method includes a set process of placing the metal patch on a forming mold for molding the blade root, a laying-up process of laying up the composite layers on the metal patch and forming the airfoil laminate, the blade root inner laminate, and the blade root outer laminate, and a hardening process of heating and hardening the airfoil laminate, the blade root inner laminate, and the blade root outer laminate, and at the laying-up process, the reinforcing fiber is oriented in the blade root inner laminate and the blade root outer laminate so that a linear expansion coefficient of the blade root is approximate to a linear expansion coefficient of the metal patch.

Advantageous Effects of Invention

According to the invention, it is possible to suppress a reduction in bonding strength between a blade root and a metal patch.

DESCRIPTION OF EMBODIMENTS

Hereinafter, embodiments of the invention are described in detail based on the drawings. The invention is not limited by the embodiments. In addition, constituent components described below in the embodiments include components able to be replaced and easily made by a person skilled in the art or components that are substantially the same. Furthermore, the components described below may be combined. In the case where the number of embodiments is two or more, the embodiments may be combined.

First Embodiment

Figure 1:
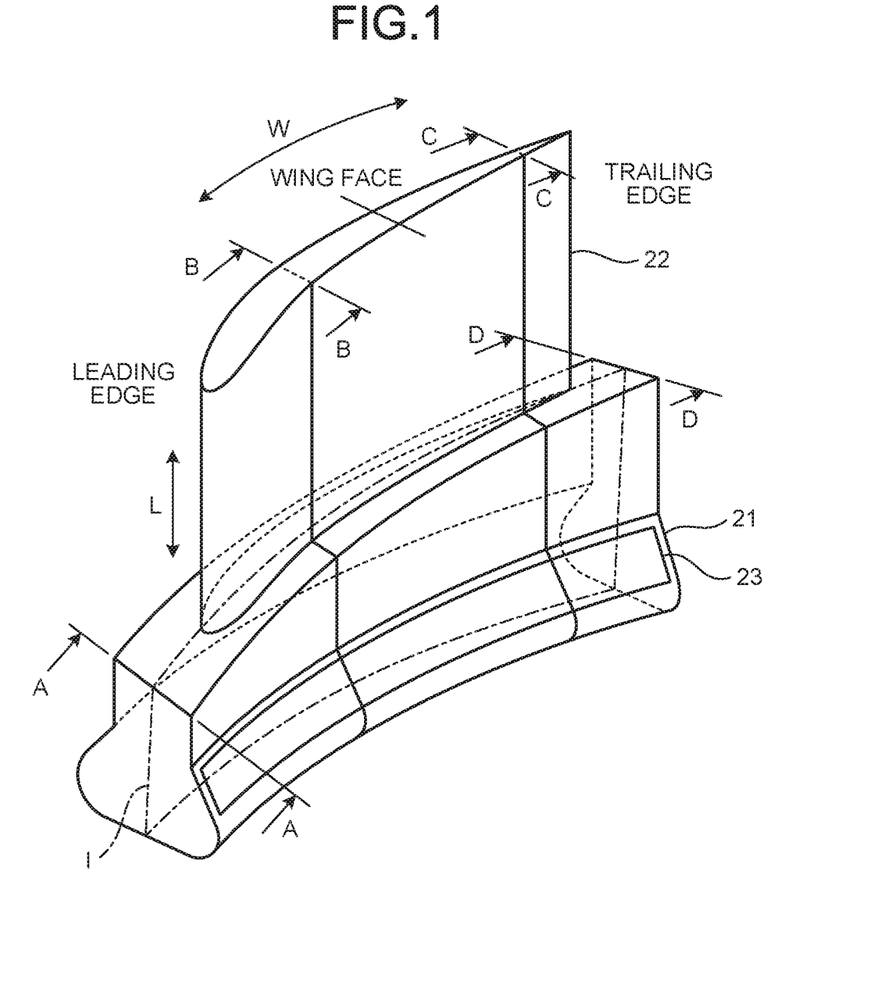
FIG. 1 is a perspective diagram illustrating the appearance of a composite blade according to a first embodiment.

FIG. 1 is a perspective diagram illustrating the appearance of a composite blade according to a first embodiment. The composite blade 10 according to the first embodiment is a blade molded using a composite material composed of reinforcing fiber and resin. As the composite blade 10, a turbine blade that is used for a gas turbine, gas turbine engine, or the like is applicable.

(Composite Blade)

As illustrated in FIG. 1, the composite blade 10 extends from the side of a blade root as a fixed end to the side of a blade tip as a free end. A direction connecting the blade root side to the blade tip side is defined as a blade length direction that is an L direction illustrated in FIG. 1. In addition, a side toward which a direction perpendicular to the blade length direction illustrated in FIG. 1 extends is defined as a leading edge side of the composite blade 10, while the other side toward which the direction perpendicular to the blade length direction illustrated in FIG. 1 extends is defined as a tailing edge side of the composite blade 10. The direction connecting the leading edge side to the tailing edge side is defined as a blade width direction that is a W direction illustrated in FIG. 1.

The composite blade 10 is molded by laying up and thermosetting a plurality of prepreg (composite layers) formed by impregnating reinforcing fiber with resin. In the first embodiment, prepreg is used, but it is sufficient if a material containing reinforcing fiber and resin is used. For example, as the reinforcing fiber, not only carbon fiber but also glass fiber and aramid fiber may be applied. The reinforcing fiber, however, is not limited to the foregoing fiber. As the reinforcing fiber, plastic fiber or metal fiber may be applied. In addition, the resin is preferably thermosetting resin, but may be thermoplastic resin. As the thermosetting resin, epoxy resin, polyester resin, and vinylester resin are exemplified. As the thermoplastic resin, polyamide resin, polypropylene resin, acrylonitrile butadiene styrene (ABS) resin, polyetheretherketone (PEEK), polyetherketoneketone (PEKK), and polyphenylene sulfide (PPS) are exemplified. The resin impregnated with the reinforcing fiber, however, is not limited to the foregoing resin and may be other resin.

The composite blade 10 includes the blade root 21 on the blade root side, an airfoil 22 on the blade tip side of the blade root 21, and metal patches 23 mounted on the blade root 21.

As illustrated in FIG. 1, the blade root 21 and airfoil 22 of the composite blade 10 are curved in the blade width direction. A side toward which the composite blade 10 is convex from the inner side to the outer side is defined as a suction side, while the other side toward which the composite blade 10 is concave from the inner side to the outer side is defined as a pressure side.

(Blade Root)

Figure 2:
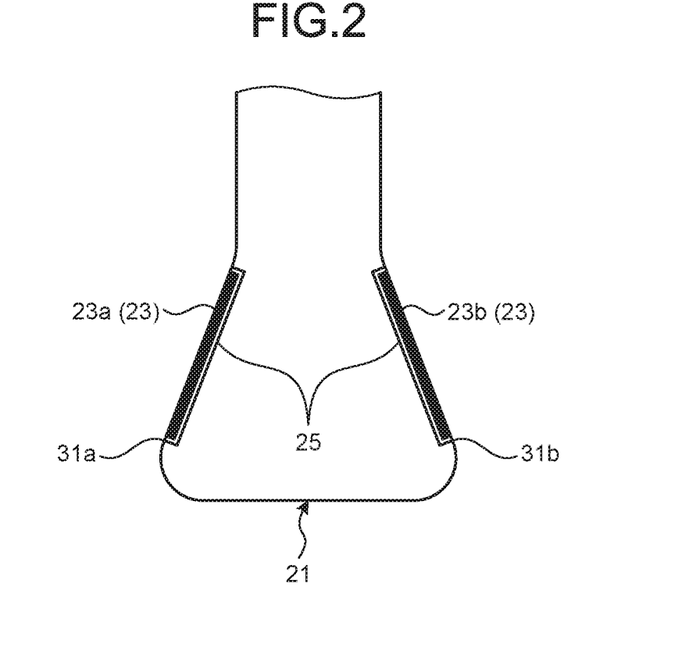
FIG. 2 is a cross-sectional diagram schematically illustrating a blade root of the composite blade according to the first embodiment.

The blade root 21 is mounted in a blade groove formed in an outer circumference of a rotor that rotates around a shaft. FIG. 2 is a cross-sectional diagram schematically illustrating the blade root of the composite blade according to the first embodiment. Specifically, FIG. 2 is a cross-sectional diagram of the blade root 21 that is taken along a plane perpendicular to the blade width direction. In the cross-sectional diagram, a direction perpendicular to the blade length direction is defined as a blade thickness direction, the side toward which the blade thickness direction extends is the suction side, and the other side toward which the blade thickness direction extends is the pressure side. In the cross-sectional diagram of FIG. 2, the blade root 21 is tapered toward the blade tip side and formed in a tapered shape, and a surface of the blade root 21 that is located on the suction side in the blade thickness direction and a surface of the blade root 21 that is located on the pressure side in the blade thickness direction are contact surfaces (also referred to as dovetail surfaces) 31a and 31b that are in contact with the blade groove. Specifically, the suction-side contact surface 31a and the pressure-side contact surface 31b form a surface tapered toward the blade tip side.

Figure 3:
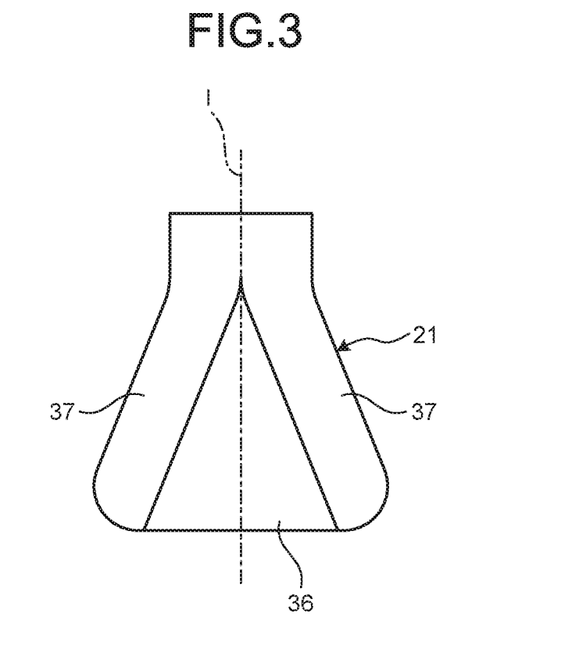
FIG. 3 is an A-A cross-sectional diagram of FIG. 1.
Figure 4:
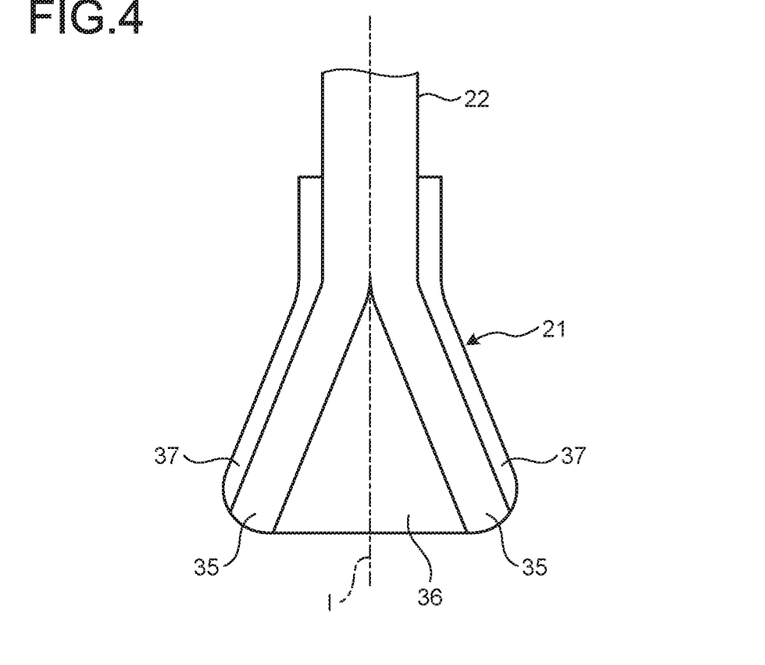
FIG. 4 is a B-B cross-sectional diagram of FIG. 1.
Figure 5:
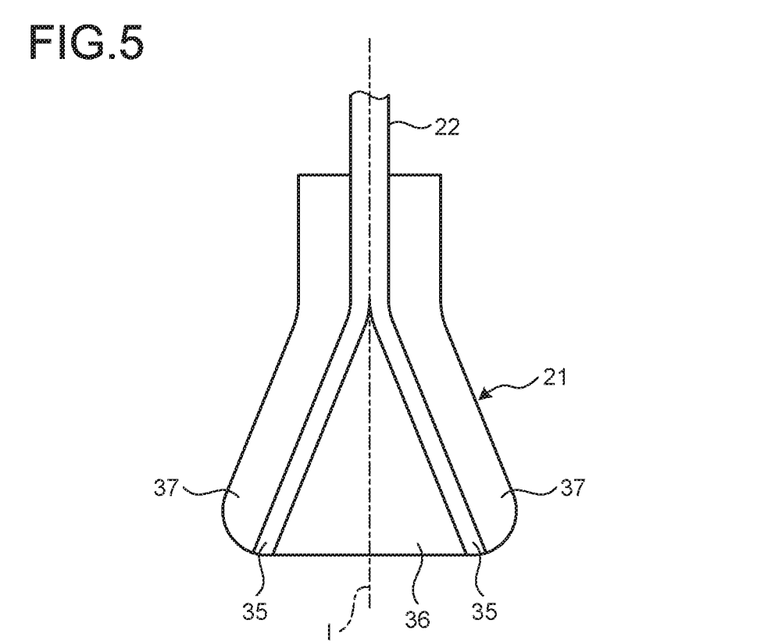
FIG. 5 is a C-C cross-sectional diagram of FIG. 1.
Figure 6:
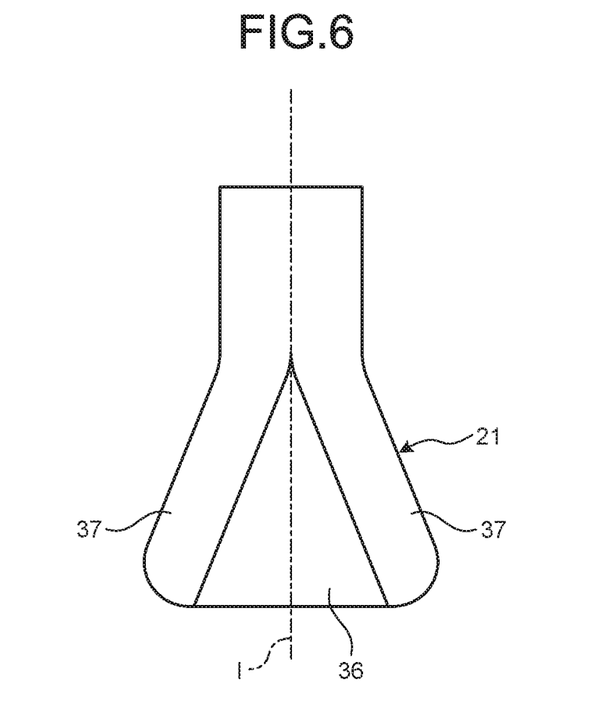
FIG. 6 is a D-D cross-sectional diagram of FIG. 1.

As illustrated in FIGS. 3 to 6, the blade root 21 is formed by hardening a laminate with a plurality of laid-up prepreg and includes a plurality of laminates. FIG. 3 is an A-A cross-sectional diagram of FIG. 1. FIG. 4 is a B-B cross-sectional diagram of FIG. 1. FIG. 5 is a C-C cross-sectional diagram of FIG. 1. FIG. 6 is a D-D cross-sectional diagram of FIG. 1.

As illustrated in FIG. 4, the blade root 21 includes airfoil laminates 35 continuous from the airfoil 22, blade root inner laminates 36 mounted on the inner side of the airfoil laminates 35, and blade root outer laminates 37 mounted on the outer side of the airfoil laminates 35. In the case where a surface that extends through the center of the blade root 21 in the blade thickness direction connecting the suction side to the pressure side is defined as a central surface I, the blade root 21 includes the laminates 35, 36, and 37 mounted on the suction side and the pressure side with respect to the central surface I.

The airfoil laminates 35 extend from the blade root 21 to the airfoil 22. In the cross-sections illustrated in FIGS. 4 and 5, the airfoil laminates 35 are intermediate layers mounted between the blade root inner laminates 36 and the blade root outer laminates 37. The airfoil laminates 35 are located on both sides of the central surface I. The suction-side and the pressure-side airfoil laminates 35 are bonded to each other at the airfoil 22 (i.e., bonded to each other where they join the airfoil). In the blade root 21, the suction-side and the pressure-side airfoil laminates 35 are more separated from each other toward the blade root side.

As illustrated in FIGS. 4 and 5, the airfoil laminates 35 exist at a central section in the blade width direction, where the airfoil 22 exists at the central section. On the other hand, as illustrated in FIGS. 3 and 6, the airfoil laminates 35 do not exist at the leading-edge-side and the tailing-edge-side sections in the blade width direction, where the airfoil 22 does not exist at the leading-edge-side and tailing-edge-side sections.

As illustrated in FIGS. 3 to 6, the blade root inner laminates 36 are formed in a substantially triangle shape in a cross-section taken along a plane perpendicular to the blade width direction. In FIGS. 4 and 5 illustrating the airfoil laminates 35, the blade root inner laminates 36 are located in a space between the suction-side and the pressure-side airfoil laminates 35. Specifically, the blade root inner laminates 36 are located on the side (inner side) of the central surface I with respect to the suction-side and the pressure-side airfoil laminates 35. On the other hand, in FIGS. 3 and 6 in which the airfoil laminates 35 is not located, the blade root inner laminates 36 are located in a space between the suction-side and pressure-side blade root outer laminates 37. Specifically, the blade root inner laminates 36 are located on the side (inner side) of the central surface I with respect to the suction-side and pressure-side blade root outer laminates 37.

As illustrated in FIGS. 3 to 6, the blade root outer laminates 37 are located on both outer sides of the blade root 21 in the blade thickness direction. In FIGS. 4 and 5 illustrating the airfoil laminates 35, the blade root outer laminates 37 are located on both outer sides of the suction-side and the pressure-side airfoil laminates 35. On the other hand, in FIGS. 3 and 6 in which the airfoil laminates 35 is not located, the blade root outer laminates 37 are located on both outer sides of the blade root inner laminates 36.

Thicknesses of the airfoil laminates 35, thicknesses of the blade root inner laminates 36, and thicknesses of the blade root outer laminates 37 in a laying-up direction are different at a predetermined position in the blade width direction.

(Airfoil)

The airfoil 22 has a thickness in the blade thickness direction that is large on the blade root side and smaller toward the blade tip side. In addition, the airfoil 22 has the thickness that is large at its central section in the blade width direction and smaller toward the leading edge side and the tailing edge side. Curved sections exist between the blade root 21 and the airfoil 22.

(Metal Patches)

The metal patches 23 are mounted on only the contact surfaces 31a and 31b of the blade root 21 and does not exist on the curved sections between the blade root 21 and the airfoil 22. Specifically, the metal patches 23 are mounted between the blade groove of the rotor and the blade root 21 mounted in the blade groove. The metal patches 23 are integrally bonded to the contact surfaces 31a and 31b of the blade root 21 using an adhesive agent. In addition, the pressure-side contact surface 31b is an inner curved surface, while the pressure-side contact surface 31a is an outer curved surface. Thus, the metal patch 23a mounted on the suction-side contact surface 31a of the blade root 21 has a larger length in the blade width direction than that of the metal patch 23b mounted on the pressure-side contact surface 31b of the blade root 21.

As illustrated in FIG. 2, the metal patches 23 are mounted in dents 25 formed in the blade root 21. The dents 25 dent with respect to the contact surfaces 31a and 31b of the blade root 21 and formed in the contact surfaces 31a and 31b, respectively. The dents 25 are formed in the same shapes as the metal patches 23 so that the metal patches 23 are able to be mounted in the dents 25.

(Regarding Fiber Orientation of Blade Root)

Figure 7:
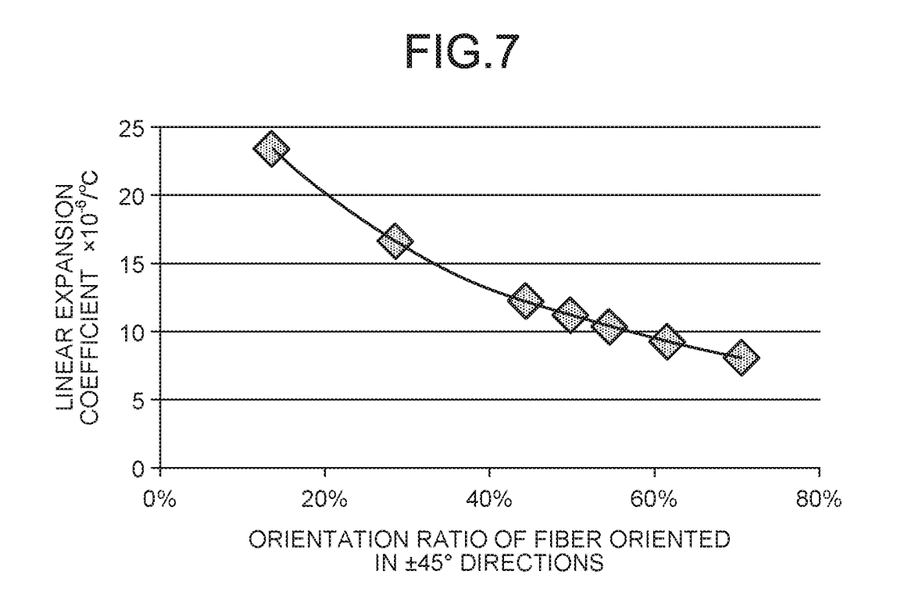
FIG. 7 is a graph illustrating relationships between an orientation ratio of reinforcing fiber in the blade root of the composite blade and a linear expansion coefficient.

An orientation ratio of the reinforcing fiber in the blade root 21 and a linear expansion coefficient of each of the metal patches 23 are described with reference to FIG. 7. FIG. 7 is a graph illustrating relationships between the orientation ratio of the reinforcing fiber in the blade root of the composite blade and the linear expansion coefficient. Since each of the metal patches 23 is composed of a metal material, each of the metal patches 23 has the predetermined linear expansion coefficient. On the other hand, the blade root 21 is the laminate and has a linear expansion coefficient depending on a fiber direction of the reinforcing fiber. Specifically, the linear expansion coefficient of the blade root 21 varies depending on the fiber direction of the reinforcing fiber included in the composite layers forming the laminate.

In the blade root 21, the reinforcing fiber is oriented in the blade root inner laminates 36 and the blade root outer laminates 37 so that the linear expansion coefficient of the blade root 21 is equal (approximate) to the linear expansion coefficient of each of the metal patches 23. Specifically, the linear expansion coefficient of each of the metal patches 23 is in a range of $10 \times 10^{-6}/°$ C. to $15 \times 10^{-6}/°$ C. The blade length direction in which the airfoil 22 extends is defined as a 0° direction. In this case, the blade root inner laminates 36 and the blade root outer laminates 37 include at least the reinforcing fiber oriented in the 0° direction and the reinforcing fiber oriented in ±45° directions. When the linear expansion coefficient is in the range of $10 \times 10^{-6}/°$ C. to $15 \times 10^{-6}/°$ C., orientation ratios of the reinforcing fiber in the blade root inner laminates 36 and the blade root outer laminates 37 are indicated by the graph illustrated in FIG. 7.

In FIG. 7, the abscissa indicates the orientation ratio (orientation proportion) of the reinforcing fiber oriented in the ±45° directions and the ordinate indicates the linear expansion coefficient. As illustrated in FIG. 7, when the linear expansion coefficient is in the range of $10 \times 10^{-6}/°$ C. to $15 \times 10^{-6}/°$ C., the orientation ratios of the reinforcing fiber oriented in the ±45° directions in the blade root inner laminates 36 and the blade root outer laminates 37 are higher than 30% and lower than 60%. More specifically, the orientation ratios of the reinforcing fiber oriented in the ±45° directions are equal to or higher than 35% and equal to or lower than 55%. In addition, in FIG. 7, the number of points plotted in a range of 35% to 55% is 3. The orientation ratios of the reinforcing fiber oriented in the ±45° directions that include the three plotted points are equal to or higher than 44% and equal to or lower than 55%. In addition, orientation ratios of the reinforcing fiber oriented in the 0° direction in the blade root inner laminates 36 and the blade root outer laminates 37 are the remaining orientation ratios. Specifically, when the orientation ratios of the reinforcing fiber oriented in the ±45° directions in the blade root inner laminates 36 and the blade root outer laminates 37 are equal to or higher than 35% and equal to or lower than 55%, the orientation ratios of the reinforcing fiber oriented in the 0° direction in the blade root inner laminates 36 and the blade root outer laminates 37 are equal to or higher than 45% and equal to or lower than 65%. As an example, when the orientation ratios of the reinforcing fiber oriented in the ±45° directions in the blade root inner laminates 36 and the blade root outer laminates 37 are 35%, the orientation ratios of the reinforcing fiber oriented in the 0° direction in the blade root inner laminates 36 and the blade root outer laminates 37 are 65%. In addition, when the orientation ratios of the reinforcing fiber oriented in the ±45° directions in the blade root inner laminates 36 and the blade root outer laminates 37 are 55%, the orientation ratios of the reinforcing fiber oriented in the 0° direction in the blade root inner laminates 36 and the blade root outer laminates 37 are 45%. Similarly, when the orientation ratios of the reinforcing fiber oriented in the ±45° directions in the blade root inner laminates 36 and the blade root outer laminates 37 are equal to or higher than 44% and equal to or lower than 55%, the orientation ratios of the reinforcing fiber oriented in the 0° direction in the blade root inner laminates 36 and the blade root outer laminates 37 are equal to or higher than 45% and equal to or lower than 56%.

By setting the orientation ratios of the reinforcing fiber in the blade root inner laminates 36 and blade root outer laminates 37 of the blade root 21 to the foregoing ratios, the blade root 21 can have the linear expansion coefficient in the range of $10 \times 10^{-6}/°$ C. to $15 \times 10^{-6}/°$ C., which is equal to the linear expansion coefficient of each of the metal patches 23.

In addition, it is preferable that the foregoing orientation ratios in the blade root 21 be as uniform as possible in the blade width direction. This is due to the fact that, when the blade root 21 is heated, the blade root 21 can be uniformly expanded in the blade width direction in the same manner as the metal patches 23.

The composite blade 10 configured in the foregoing manner is mounted in the blade groove formed in the outer circumference of the rotor that rotates around the shaft. Therefore, the metal patches 32 of the composite blade 10 are located between the blade groove and the blade root 21 and are in contact with the blade groove. In addition, a plurality of the composite blades 10 are arranged in a circumferential direction at predetermined intervals on the outer circumference of the rotor that rotates around the shaft. When the rotor rotates, a fluid flows from the leading edge side toward the tailing edge side between the composite blades 10. In this case, centrifugal force is applied to the composite blades 10 in blade length directions due to the rotation of the rotor. When the centrifugal force is applied in the blade length directions of the composite blades 10, friction force occurs in interfaces between the blade groove and the metal patches 23 and is transferred to interfaces between the metal patches 23 and the blade roots 21 and applied as shear stress to the interfaces between the metal patches 23 and the blade roots 21. In this case, since the fluid is a high-temperature fluid, the blade roots 21 and the metal patches 23 are heated. Even when the blade roots 21 and the metal patches 23 are heated, the linear expansion coefficient of each of the blade roots 21 is equal to the linear expansion coefficient of each of the metal patches 23. Therefore, the shear stress that occurs in adhesive interfaces between the blade roots 21 and the metal patches 23 is small.

Figure 8:
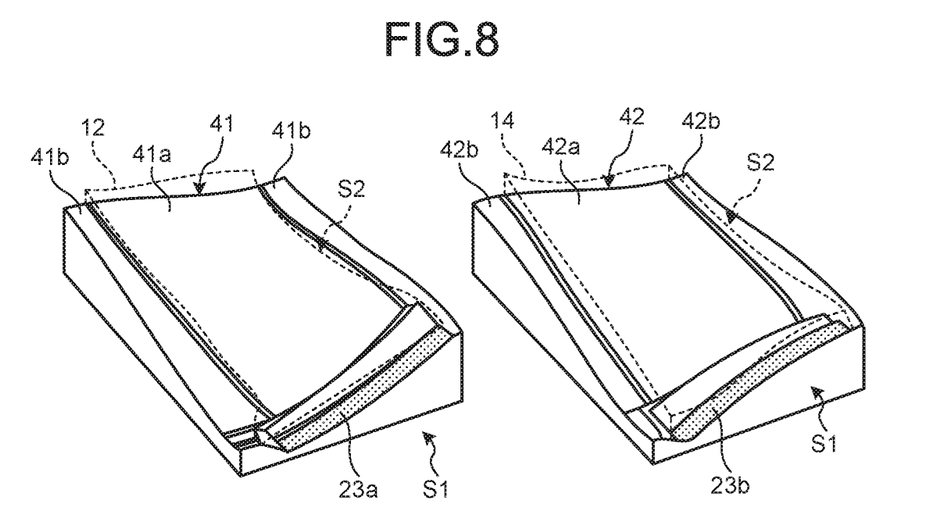
FIG. 8 is a diagram illustrating a method for molding the composite blade according to the first embodiment.

Next, a method for molding the composite blade 10 is described with reference to FIG. 8. FIG. 8 is a diagram illustrating the method for molding the composite blade according to the first embodiment. The composite blade 10 is formed by bonding a suction-side blade member 12 to a pressure-side blade member 14. The suction-side blade member 12 is a suction-side section, while the pressure-side blade member 14 is a pressure-side section.

The suction-side blade member 12 is formed by laying up and thermosetting a plurality of prepreg formed by impregnating reinforcing fiber with resin. The suction-side blade member 12 is molded using a suction-side mold 41. The suction-side blade member 12 is formed so that an outer surface of the composite blade 10 is convex and is formed in a curved shape and that an inner surface of the composite blade 10 is concave and formed in a curved shape. The suction-side mold 41 includes a suction-side forming surface 41a for molding an outer surface of the suction-side blade member 12 and a flat suction-side mold matching surface 41b existing around the suction-side forming surface 41a. The suction-side forming surface 41a is formed in a concave shape to mold the outer surface of the suction-side blade member 12 so that the outer surface of the suction-side blade member 12 is convex and is formed in a curved shape.

The pressure-side blade member 14 is formed by laying up and thermosetting a plurality of prepreg formed by impregnating reinforcing fiber with resin, similarly to the suction-side blade member 12. The pressure-side blade member 14 is molded using a pressure-side mold 42. The pressure-side blade member 14 is formed so that the outer surface of the composite blade 10 is concave and formed in the curved shape and that the inner surface of the composite blade 10 is convex and is formed in the curved shape. The pressure-side mold 42 includes a pressure-side forming surface 42a for molding an outer surface of the pressure-side blade member 14 and a flat pressure-side mold matching surface 42b existing around the pressure-side forming surface 42a. The pressure-side forming surface 42a is convex and is formed to mold the outer surface of the pressure-side blade member 14 so that the outer surface of the pressure-side blade member 14 is concave and formed in a curved shape.

In the method for molding the composite blade, the metal patch 23a to be mounted on the blade root 21 on the suction side is placed on the suction-side forming surface 41a, corresponding to the blade root 21, of the suction-side mold 41 (at step S1: set process). Similarly, the metal patch 23b to be mounted on the blade root 21 on the pressure side is placed on the pressure-side forming surface 42a, corresponding to the blade root 21, of the pressure-side mold 42 (at step S1: set process).

After that, a laying-up process is performed to lay up the prepreg on the suction-side metal patch 23a and form the suction-side blade member 12 before hardening (at step S2). Similarly, the laying-up process is performed to lay up the prepreg on the pressure-side metal patch 23b and form the pressure-side blade member 14 before hardening (at step S2). In this case, at the laying-up process of S2, the prepreg is laid up based on the foregoing orientation ratios so that the linear expansion coefficient of the blade root 21 is equal to the linear expansion coefficient of each of the metal patches 23. Specifically, at the laying-up process of S2, the prepreg containing the reinforcing fiber oriented in the ±45° directions is laid up so that the orientation ratios of the reinforcing fiber oriented in the ±45° directions in the blade root inner laminates 36 and the blade root outer laminates 37 are equal to or higher than 35% and equal to or lower than 55%, and the prepreg containing the reinforcing fiber oriented in the 0° direction is laid up so that the remaining orientation ratios of the reinforcing fiber oriented in the 0° direction in the blade root inner laminates 36 and the blade root outer laminates 37 are equal to or higher than 45% and equal to or lower than 65%.

Then, the suction-side blade member 12 and the pressure-side blade member 14 overlap each other before hardening by overlapping the suction-side mold matching surface 41b of the suction-side mold 41 and the pressure-side mold matching surface 42b of the pressure-side mold 42. After that, the composite blade 10 is molded by performing a hardening process of heating and hardening the suction-side blade member 12 and the pressure-side blade member 14 via the suction-side mold 41 and the pressure-side mold 42.

In the foregoing method for molding the composite blade 10, the composite blade 10 is molded by heating and hardening the suction-side blade member 12 and the pressure-side blade member 14 as well as the metal patches 23a and 23b. The method, however, is not limited to this. As the method for molding the composite blade 10, for example, after the composite blade 10 is hardened, the metal patches 23a and 23b may be bonded using an adhesive agent for high-temperature hardening.

As described above, according to the first embodiment, the reinforcing fiber can be oriented in the blade root inner laminates 36 and the blade root outer laminates 37 so that the linear expansion coefficient of the blade root 21 is equal to the linear expansion coefficient of each of the metal patches 23. Thus, even when the blade root 21 and the metal patches 23 are thermally expanded upon the heating, it is possible to reduce shear stress that occurs in the adhesive interfaces between the blade root 21 and the metal patches 23. It is, therefore, possible to suppress a reduction in bonding strength between the blade root 21 and the metal patches 23.

In addition, according to the first embodiment, by setting the orientation ratios of the reinforcing fiber oriented in the ±45° directions to ratios equal to or higher than 35% and equal to or lower than 55%, the linear expansion coefficient of the blade root 21 can be equal to the linear expansion coefficient of each of the metal patches 23.

In addition, according to the first embodiment, by setting the orientation ratios of the reinforcing fiber oriented in the 0° direction to ratios equal to or higher than 45% and equal to or lower than 65%, the linear expansion coefficient of the blade root 21 can be equal to the linear expansion coefficient of each of the metal patches 23.

In addition, according to the first embodiment, the metal patches 23 are mounted on only the blade root 21, but not mounted on the curved sections between the blade root 21 and the airfoil 22. Shear stress is concentrated on the curved sections due to a tensile load that occurs in the airfoil 22 upon the rotation of the composite blade 10 and a compression load that occurs in the blade root 21. In this case, since the metal patches 23 are mounted on only the blade root 21, it is possible to reduce the risk that the metal patches 23 are peeled off due to the stress concentrated on the curved sections.

In addition, according to the first embodiment, the dents 25 for mounting the metal patches 23 on the blade root 21 can be formed. Thus, positions at which the metal patches 23 are to be mounted can be clarified. In addition, the shapes of the metal patches 23 can be more flexibly managed by adjusting a thickness of a layer of the adhesive for bonding the metal patches 23 to the blade root 21.

Second Embodiment

Figure 9:
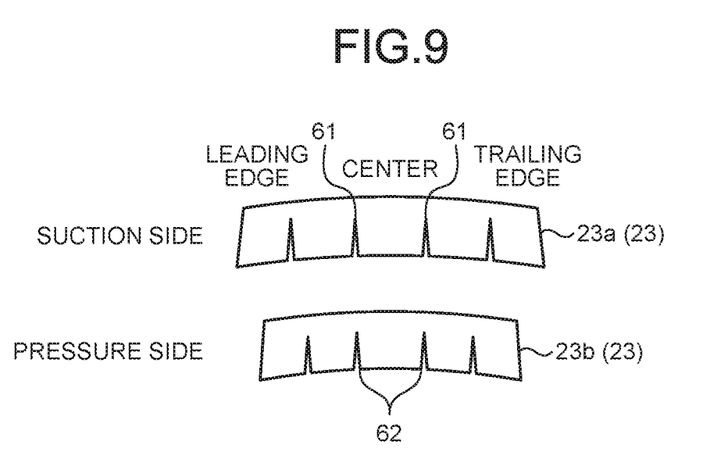
FIG. 9 is a schematic diagram illustrating metal patches of a composite blade according to a second embodiment.
Figure 10:
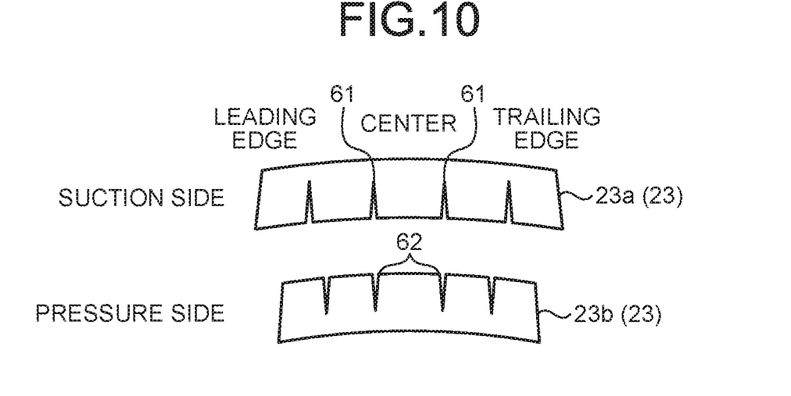
FIG. 10 is a schematic diagram illustrating another example of the metal patches of the composite blade according to the second embodiment.

Next, a composite blade 10 according to a second embodiment is described with reference to FIGS. 9 and 10. The second embodiment describes features different from the first embodiment to avoid the repetitive description and describes the same configurations as those described in the first embodiment using the same reference signs. FIG. 9 is a schematic diagram illustrating metal patches of the composite blade according to the second embodiment. FIG. 10 is a schematic diagram illustrating another example of the metal patches of the composite blade according to the second embodiment.

In the composite blade 10 according to the second embodiment, a plurality of cuts 61 are formed in the metal patch 23a and a plurality of cuts 62 are formed in the metal patch 23b. The metal patches 23 illustrated in FIG. 9 are the suction-side metal patch 23a illustrated on the upper side of FIG. 9 and the pressure-side metal patch 23b illustrated on the lower side of FIG. 9. The cuts 61 of the metal patch 23a and the cuts 62 of the metal patch 23b are formed by cutting from the blade root side. The cuts 61 and 62 are fractures formed at predetermined intervals in the blade width direction of the metal patches 23. Each of the cuts 61 and 62 is formed in a triangle shape with a base on the blade root side and a vertex on the blade tip side. The cuts 61 and 62 extend in the blade length direction and have lengths in the blade length direction that are equal to or smaller than ¾ of entire lengths of the metal patches 23 in the blade length direction. Therefore, portions of sections in which the cuts 61 of the metal patch 23a are formed are continuous in the blade length direction, and portions of sections in which the cuts 62 of the metal patch 23b are formed are continuous in the blade length direction. Widths of the cuts 62 of the metal patch 23b in the blade width direction are longer than widths of the cuts 61 of the metal patch 23a in the blade width direction.

In addition, the cuts 62 of the metal patch 23b may be cuts illustrated in FIG. 10. Specifically, as illustrated in FIG. 1, a length of the blade root 21 in the blade width direction on the pressure side and the blade root side is shorter than a length of the blade root 21 in the blade width direction on the pressure side and the blade tip side. Therefore, the cuts 62 of the metal patch 23b are formed by cutting from the blade tip side.

As described above, according to the second embodiment, since the cuts 61 and 62 are formed in the metal patches 23, the metal patches 23 are allowed to spread and shrink in the blade width direction. Therefore, the metal patches 23 can accommodate thermal elongation upon thermosetting of the blade root 21.

REFERENCE SIGNS LIST

10 Composite blade
12 Suction-side blade member
14 Pressure-side blade member
21 Blade root
22 Airfoil
23 Metal patch
25 Dent
31a, 31b Contact surface
35 Airfoil laminate
36 Blade root inner laminate
37 Blade root outer laminate
41 Suction-side mold
42 Pressure-side mold
61 Cut
I Central surface

The invention claimed is:

1. A composite blade formed by laying up composite layers containing reinforcing fiber and resin, the composite blade comprising:
a blade root mounted in a blade groove;
an airfoil extending from the blade root to a front end side; and
a metal patch mounted between the blade groove and the blade root, and bonded to the blade root,
wherein the blade root is a laminate with the laid-up composite layers and includes:
airfoil laminates continuous from the airfoil, the airfoil laminates being bonded together at the airfoil and being separated from each other at the blade root,
a blade root inner laminate mounted on the inner side of each of the airfoil laminates, and
a blade root outer laminate mounted on the outer side of each of the airfoil laminates,
wherein the reinforcing fiber is oriented in the blade root inner laminate and the blade root outer laminate so that a linear expansion coefficient of the blade root is approximate to a linear expansion coefficient of the metal patch, and
wherein when a direction in which the airfoil extends is defined as a 0° direction, orientation ratios of the reinforcing fiber oriented in ±45° directions in the blade root inner laminate and the blade root outer laminate are higher than 30% and lower than 60%.

2. The composite blade according to claim 1, wherein the orientation ratios of the reinforcing fiber oriented in the ±45° directions in the blade root inner laminate and the blade root outer laminate are equal to or higher than 35% and equal to or lower than 55%.

3. The composite blade according to claim 2, wherein orientation ratios of the reinforcing fiber oriented in the 0° direction in the blade root inner laminate and the blade root outer laminate are equal to or higher than 45% and equal to or lower than 65% and are the remaining orientation ratios of the orientation ratios of the reinforcing fiber oriented in the ±45° directions.

4. The composite blade according to claim 2, wherein the orientation ratios of the reinforcing fiber oriented in the ±45° directions in the blade root inner laminate and the blade root outer laminate are equal to or higher than 44% and equal to or lower than 55%.

5. The composite blade according to claim 1, wherein:
a curved section exists between the blade root and the airfoil, and
the metal patch is mounted on only the blade root.

6. The composite blade according to claim 1, wherein the blade root includes a dent on which the metal patch is mounted.

7. A composite blade formed by laying up composite layers containing reinforcing fiber and resin, the composite blade comprising:
a blade root mounted in a blade groove;

an airfoil extending from the blade root to a front end side; and a metal patch mounted between the blade groove and the blade root, and bonded to the blade root, wherein the blade root is a laminate with the laid-up composite layers and includes:

airfoil laminates continuous from the airfoil, the airfoil laminates being bonded together at the airfoil and being separated from each other at the blade root, a blade root inner laminate mounted on the inner side of each of the airfoil laminates, and a blade root outer laminate mounted on the outer side of each of the airfoil laminates, wherein the reinforcing fiber is oriented in the blade root inner laminate and the blade root outer laminate so that a linear expansion coefficient of the blade root is approximate to a linear expansion coefficient of the metal patch, and wherein when a direction extending from the side of the blade root to the front end side is defined as a length direction and a direction perpendicular to the length direction is defined as a width direction in a mounting surface of the blade root on which the metal patch is mounted, the metal patch includes cuts formed at predetermined intervals in the width direction.

8. A method for molding a composite blade formed by laying up composite layers containing reinforcing fiber and resin, wherein the composite blade includes:

a blade root mounted in a blade groove, an airfoil extending from the blade root to a front end side, and a metal patch mounted between the blade groove and the blade root and bonded to the blade root, and wherein the blade root is a laminate with the laid-up composite layers and includes:

airfoil laminates continuous from the airfoil, the airfoil laminates being bonded together at the airfoil and being separated from each other at the blade root, a blade root inner laminate mounted on the inner side of each of the airfoil laminates, and a blade root outer laminate mounted on the outer side of each of the airfoil laminates, the method comprising:

a set process of placing the metal patch on a forming mold for molding the blade root;

a laying-up process of laying up the composite layers on the metal patch and forming the airfoil laminates, the blade root inner laminate, and the blade root outer laminate; and a hardening process of heating and hardening the airfoil laminates, the blade root inner laminate, and the blade root outer laminate, and at the laying-up process, the reinforcing fiber is oriented in the blade root inner laminate and the blade root outer laminate so that a linear expansion coefficient of the blade root is approximate to a linear expansion coefficient of the metal patch, wherein when a direction in which the airfoil extends is defined as a 0° direction, orientation ratios of the reinforcing fiber oriented in ±45° directions in the blade root inner laminate and the blade root outer laminate are higher than 30% and lower than 60%.

* * * * *